United States Patent
Adachi et al.

(10) Patent No.: US 9,627,102 B2
(45) Date of Patent: Apr. 18, 2017

(54) WIRE HARNESS

(71) Applicant: YAZAKI CORPORATION, Tokyo (JP)

(72) Inventors: Hideomi Adachi, Shizuoka (JP); Shoji Masunari, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/729,480

(22) Filed: Jun. 3, 2015

(65) Prior Publication Data

US 2015/0294764 A1  Oct. 15, 2015

Related U.S. Application Data

(63) Continuation of application No. PCT/JP2013/084762, filed on Dec. 25, 2013.

(30) Foreign Application Priority Data

Dec. 25, 2012 (JP) ................................. 2012-280884

(51) Int. Cl.
| | | |
|---|---|---|
| *H01B 7/18* | (2006.01) | |
| *B60R 16/02* | (2006.01) | |
| *H02G 3/04* | (2006.01) | |
| *H01B 7/00* | (2006.01) | |
| *H01B 7/04* | (2006.01) | |

(52) U.S. Cl.
CPC ......... *H01B 7/184* (2013.01); *B60R 16/0215* (2013.01); *H01B 7/0045* (2013.01); *H01B 7/04* (2013.01); *H02G 3/0468* (2013.01); *H02G 3/0487* (2013.01)

(58) Field of Classification Search
CPC combination set(s) only.
See application file for complete search history.

(56) References Cited

U.S. PATENT DOCUMENTS 2,999,497 A * 9/1961 Hamilton .................. A62B 9/00
128/204.18
3,234,969 A * 2/1966 Du Mont ............... B29D 23/18
138/121

(Continued)

FOREIGN PATENT DOCUMENTS

| JP | 58-72925 U | 5/1983 |
|---|---|---|
| JP | 2001-251736 A | 9/2001 |

(Continued)

OTHER PUBLICATIONS

English language of the Written Opinion of the International Search Report for PCT/JP2013/084762 dated Jan. 28, 2014.

(Continued)

*Primary Examiner* — William H Mayo, III
*Assistant Examiner* — Krystal Robinson
(74) *Attorney, Agent, or Firm* — Keneally Vaidya LLP (57) ABSTRACT

An outer cover includes a flexible tube portion having flexibility and an inflexible tube portion. The flexible tube portion has a corrugated tubular shape in which concave portions and convex portions both extending in a circumferential direction are alternately formed side by side in an axial direction and in which intervals of the adjacent concave portions or intervals between the adjacent convex portions are partially changed.

9 Claims, 7 Drawing Sheets

(56) References Cited

U.S. PATENT DOCUMENTS

| | | | | |
|---|---|---|---|---|
| 3,594,893 | A * | 7/1971 | Kuypers | B21D 39/04 228/173.2 |
| 3,595,275 | A * | 7/1971 | Steans | F16L 59/153 138/114 |
| 3,605,817 | A * | 9/1971 | Bauman | A47L 9/24 138/121 |
| 3,750,444 | A * | 8/1973 | Bittner | B21D 15/04 29/890.048 |
| 3,779,312 | A * | 12/1973 | Withers, Jr. | B21D 15/06 138/122 |
| 3,824,826 | A * | 7/1974 | Charvet | B21D 15/04 72/77 |
| 3,908,704 | A * | 9/1975 | Clement | A61F 2/06 128/204.18 |
| 3,918,285 | A * | 11/1975 | Charvet | B21D 15/04 72/77 |
| 3,926,222 | A * | 12/1975 | Shroy | E02B 11/005 138/122 |
| 4,463,755 | A * | 8/1984 | Suzuki | A61M 16/08 128/200.18 |
| 4,819,970 | A * | 4/1989 | Umehara | F16L 11/15 138/121 |
| 6,123,113 | A * | 9/2000 | Pontbriand | F16L 11/11 138/119 |
| 7,104,574 | B2 * | 9/2006 | Dukes | F16L 25/0045 285/370 |
| 8,230,885 | B2 * | 7/2012 | Krauss | F16L 11/11 138/109 |
| 2002/0000499 | A1 * | 1/2002 | Aoki | F16L 3/10 248/74.4 |
| 2002/0179312 | A1 | 12/2002 | Santelli, Jr. | |
| 2003/0222183 | A1 * | 12/2003 | Kato | H02G 3/0487 248/49 |
| 2004/0154817 | A1 * | 8/2004 | Sudo | H02G 3/06 174/481 |
| 2005/0011687 | A1 * | 1/2005 | Yamaguchi | B60K 6/48 180/65.1 |
| 2007/0102182 | A1 * | 5/2007 | Okada | H02G 3/0468 174/68.1 |
| 2011/0132638 | A1 | 6/2011 | Oga et al. | |

FOREIGN PATENT DOCUMENTS

| | | | | |
|---|---|---|---|---|
| JP | 2001251736 | A | * | 9/2001 |
| JP | 2007-60780 | A | | 3/2007 |
| JP | 2009-71931 | A | | 4/2009 |
| JP | 2009-143326 | A | | 7/2009 |
| JP | 2009143326 | A | * | 7/2009 |
| JP | 2010-51042 | A | | 3/2010 |
| JP | 2012-217289 | A | | 11/2012 |

OTHER PUBLICATIONS

International Search Report for PCT/JP2013/084762 dated Jan. 28, 2014.
Japanese Office Action for the related Japanese Patent Application No. 2012-280884 dated Mar. 1, 2016.
The extended European Search Report for the related European Patent Application No. 138698022 dated Jul. 26, 2016.
Chinese Office Action for the related Chinese Patent Application No. 201380068149.7 dated Oct. 24, 2016.

* cited by examiner

WIRE HARNESS

CROSS REFERENCE TO RELATED APPLICATIONS

This application is a continuation of International Patent Application No. PCT/JP2013/084762 filed on Dec. 25, 2013, claiming priority from Japanese Patent Application No. 2012-280884 filed on Dec. 25, 2012, the contents of which are incorporated herein by reference.

FIELD OF INVENTION

The present invention relates to a wire harness including an electrically-conducting path and a resin outer cover in which the electrically-conducting path is inserted.

BACKGROUND ART

As conventional wire harnesses, there is known for example a wire harness that electrically connects high-tension (i.e., high-voltage) devices installed in a hybrid electric vehicle or in an electric vehicle.

A wire harness disclosed in Patent Document 1 identified below includes a plurality of electrically-conducting paths, a resin corrugated tube accommodating the plurality of electrically-conducting paths collectively, and a resin protector. The corrugated tube is formed into a corrugated tubular shape having flexibility, and multiple corrugated tubes are provided so as to be aligned in a longitudinal direction of the wire harness. The protector is provided at a position where the adjacent corrugated tubes are connected to each other. The corrugated tubes and the projectors are used as an outer cover.

Patent Document 1: JP 2010-51042A

In the conventional art described above, the protector is disposed at a portion where the routing needs to be regulated, and the corrugated tubes are connected together by the protector. In contrast, the inventors of this application consider that a configuration in which rigid straight tubes are adopted and the rigid straight tubes are molded integrally with corrugated tubes is more effective in regulating the routing of a wire harness than the configuration in which the corrugated tubes are connected together by the protector.

Although the corrugated tube is formed into a bendable shape (in other words, a flexible shape), the corrugated tube is not always bent smoothly at a position where bending stress is easily applied.

SUMMARY OF INVENTION

The invention has been made in view of these situations, and an object thereof is to provide a wire harness including an outer cover which can be bent smoothly even at a position where bending stress is easily applied while enabling a favorable routing regulation.

With a view to achieving the object, a wire harness according to the present invention has the following features (1) to (6).

(1) A wire harness including at least one electrically-conducting path and a tubular outer cover made of resin and covering the electrically-conducting path, wherein the outer cover includes a flexible tube portion having flexibility and an inflexible tube portion having smaller flexibility than the flexible tube portion, and wherein the flexible tube portion has a corrugated tubular shape in which concave portions and convex portions both extending in a circumferential direction are alternately formed side by side in an axial direction of the flexible tube portion and in which intervals between the adjacent concave portions or intervals between the adjacent convex portions are partially changed in the axial direction.

In the outer cover of the wire harness according to (1) described above, the flexible tube portion is formed into the corrugated tubular shape, and the inflexible tube portion is formed into, for example, a rigid, straight tubular shape. Therefore, although no protector is used, the wire harness is effective in regulating the routing thereof. Additionally, in the outer cover of the wire harness according to (1) described above, the flexible tube portion is formed into the corrugated tubular shape in which the intervals between the adjacent concave portions or the intervals between the adjacent convex portions are changed partially, and therefore, the outer cover can be bent smoothly even in the position where bending stress tends to be applied easily. Namely, since the intervals between the adjacent concave portions or the intervals between the adjacent convex portions are not made constant but are set to arbitrary intervals, the outer cover can be bent (that is, can be deflected) smoothly even in the position where bending stress tends to be applied easily by narrowing the intervals. On the contrary, the outer cover can also be made not to be bent more than required by widening the intervals. According to the wire harness of (1) described above, good routing can be realized by including the outer cover described heretofore. As a result, according the wire harness of (1) described above, it is possible to provide the wire harness including the outer cover which can be bent even in the position where bending stress tends to be applied easily while improving the routing regulation.

(2) The wire harness according to (1) described above, wherein the flexible tube portion has a low-flexibility section and a high-flexibility section, the intervals between the adjacent concave portions or the intervals between the adjacent convex portions being narrower in the high-flexibility section than in the low-flexibility section.

According to the wire harness of (2) described above, by disposing the high-flexibility section in, for example, the position where bending stress tends to be applied easily, the wire harness can be bent smoothly even in the position where bending stress tends to be applied easily. Additionally, by disposing the low-flexibility section in a position where the wire harness should not be bent more than required, the wire harness can be made not to be bent more than required in that position.

(3) The wire harness according to (2) described above, wherein the flexible tube portion has the high-flexibility section at a portion adjoining the inflexible tube portion.

According to the wire harness of (3) described above, the wire harness can be bent smoothly in the position where bending stress tends to be applied easily, or specifically at the position of the adjoining portion between the flexible tube portion and the inflexible tube portion. When the wire harness can be bent smoothly, even though the wire harness is bent largely or drastically (in other words, is deflected largely or drastically), whitening on bending can be prevented from being generated in, for example, the outer cover. As a result, according to the wire harness of (3) described above, the wire harness can be bent smoothly at the adjoining portion between the flexible tube portion and the inflexible tube portion.

(4) The wire harness according to (3) described above, wherein a ridge height of the convex portion at the adjoining portion is greater in the low-flexibility section than in the low-flexibility section.

According to the wire harness of (4) described above, the wire harness can be bent more smoothly at the adjoining portion between the flexible tube portion and the inflexible tube portion.

(5) The wire harness according to any one of (1) to (4) described above, wherein the outer cover is configured such that there is no slit extending along the axial direction.

According to the wire harness of (5) described above, the projection of the electrically-conducting path can be prevented at the flexible tube portion when the wire harness is bent (that is, when the wire harness is deflected). Additionally, at the inflexible tube portion, an increase in rigidity can be realized. Further, in the whole of the outer cover, the intrusion of water into an interior of the outer cover can be prevented, thereby making it possible to realize an improvement in waterproofness. In addition, according to the wire harness of (5) described above, only by inserting the electrically-conducting path into the outer cover so as to extend therethrough, the electrically-conducting path can be covered easily. Thus, the electrically-conducting path does not have to be inserted into the interior of the outer cover via a slit, and therefore, an improvement in workability can also be realized. As a result, according the wire harness of (5) described above, not only can the projection of the electrically-conducting path be prevented, but also the improvement in workability can be realized.

(6) The wire harness according to any one of (1) to (5) described above, wherein the electrically-conducting path and the outer cover are configured to be arranged from a front to a rear of a vehicle floor through an underside of the vehicle floor.

According to the wire harness of (6) described above, the wire harness can be applied to a long wire harness. As a result, according to the wire harness of (6) described above, the wire harness can be applied to regulating the routing of a long wire harness or realizing smooth bending.

EMBODIMENTS OF INVENTION

A wire harness according to an embodiment of the invention includes an electrically-conducting path and a resin sheathing in which the electrically-conducting path is inserted. The sheathing has formed thereon an inflexible tube portion and a flexible tube portion of a corrugated tubular shape. In the corrugated flexible tube portion, intervals between adjacent concave portions or intervals between adjacent convex portions are not constant but are set to arbitrary intervals. Specifically, the intervals are narrowed at a position where bending stress is easily applied, whereby the wire harness is allowed to be bent smoothly. This can also prevent the generation of whitening on bending, for example.

Figure 1:
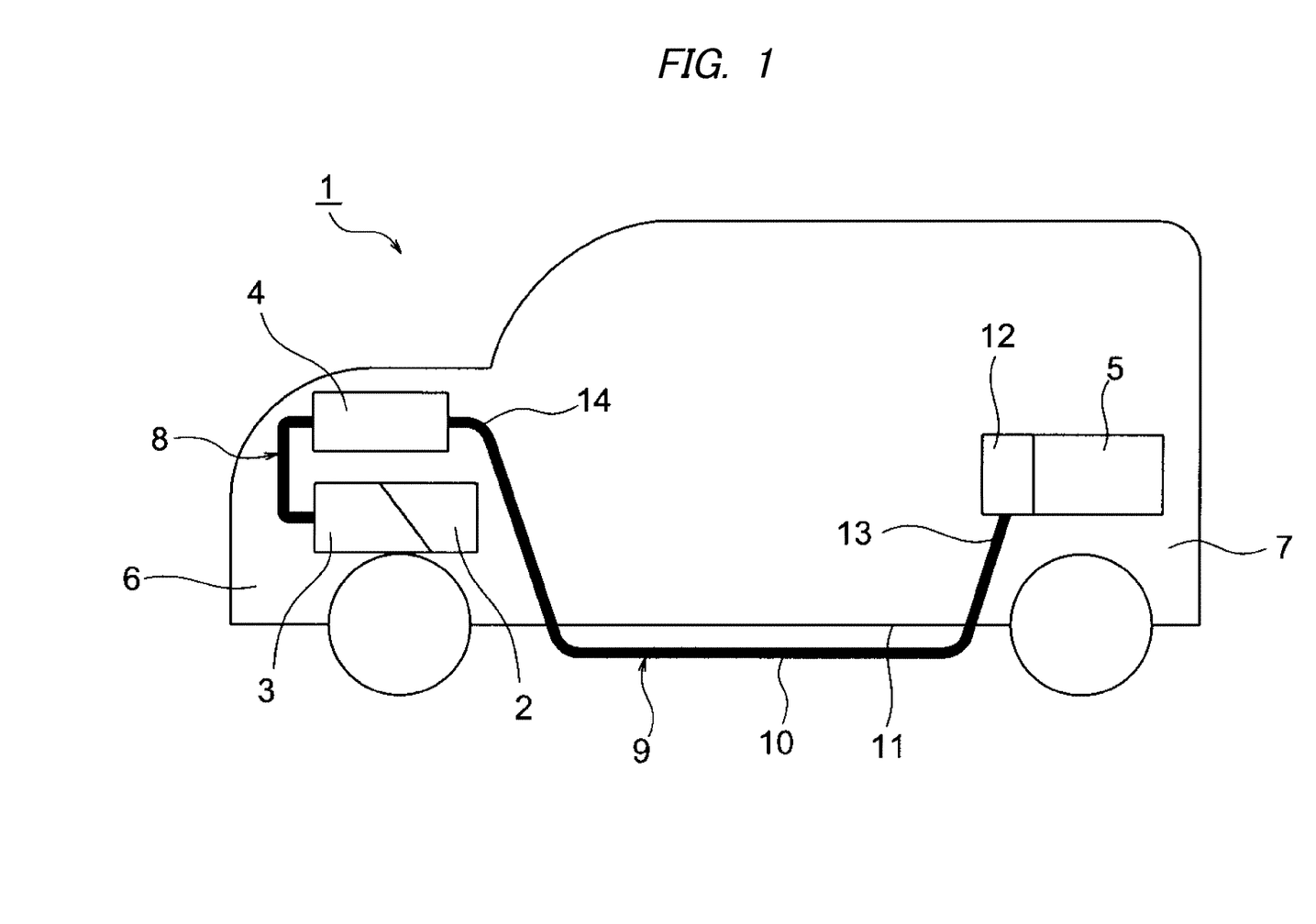
FIG. 1 is a schematic view showing a routing of a wire harness according to an embodiment of the invention.
Figure 2:
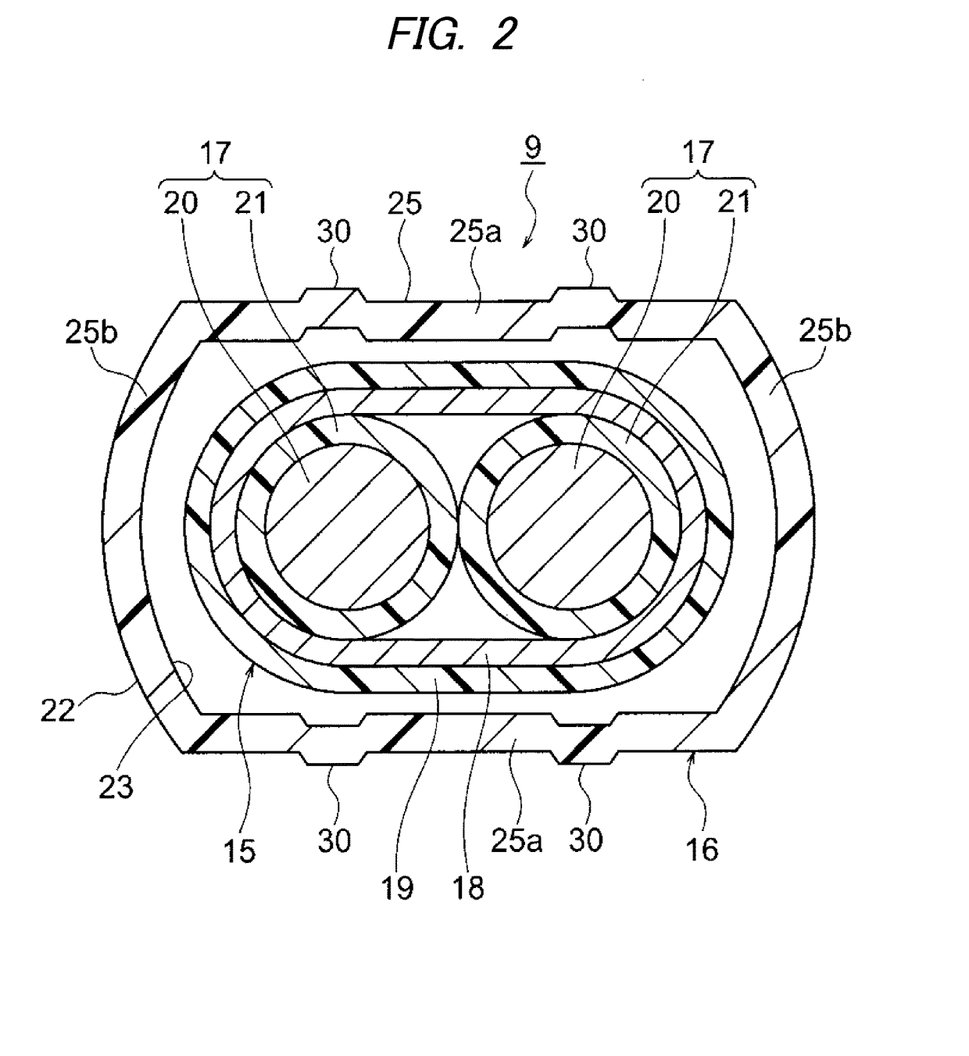
FIG. 2 is a cross-sectional view of the wire harness.
Figure 3:
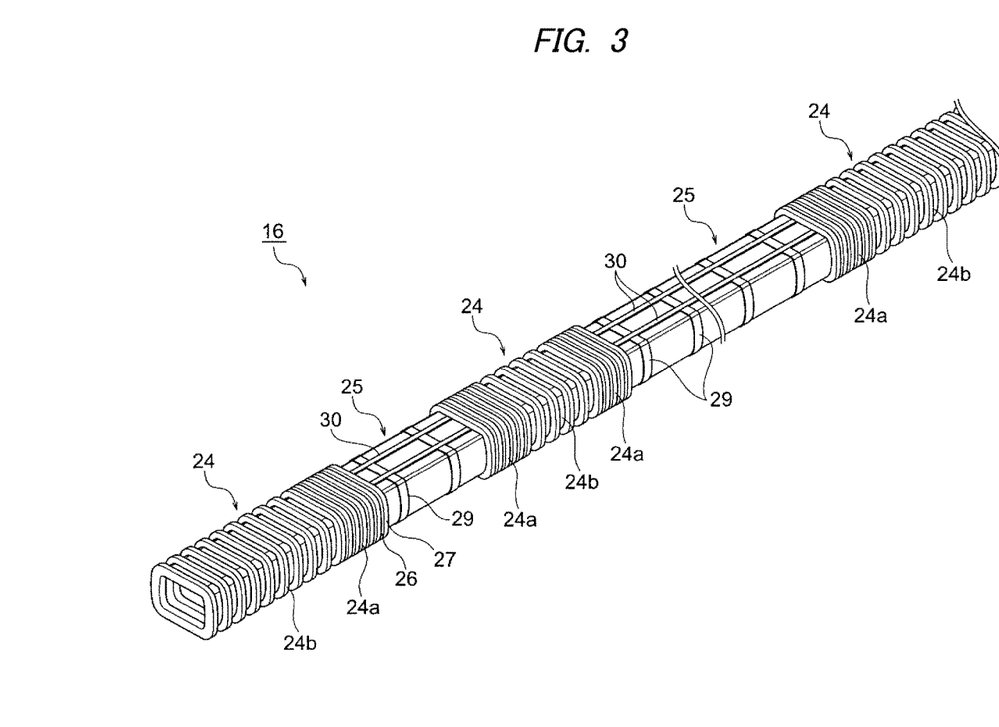
FIG. 3 is a perspective view of an outer cover.
Figure 4:
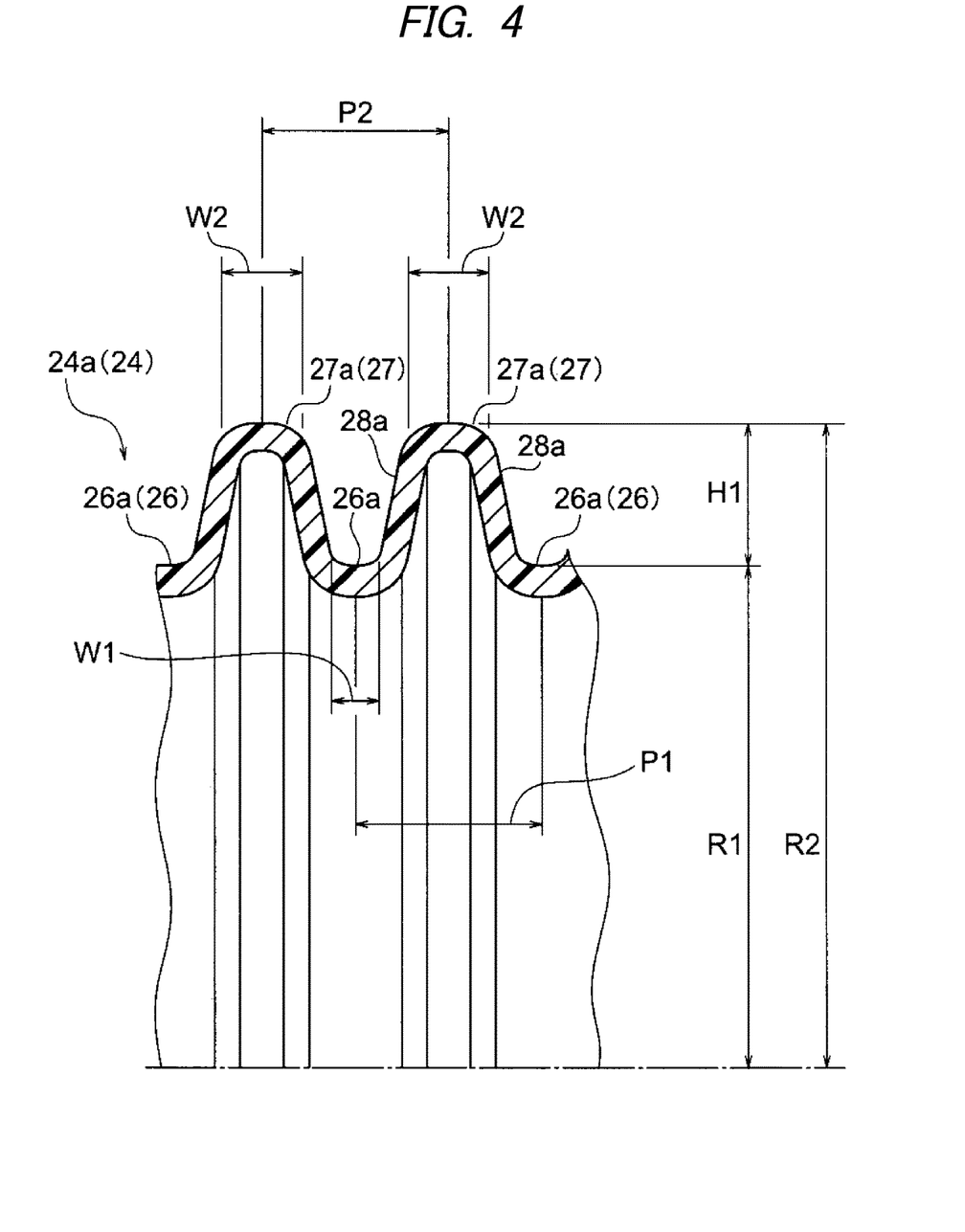
FIG. 4 is a vertical sectional view of a high-flexibility section at a flexible tube portion.
Figure 5:
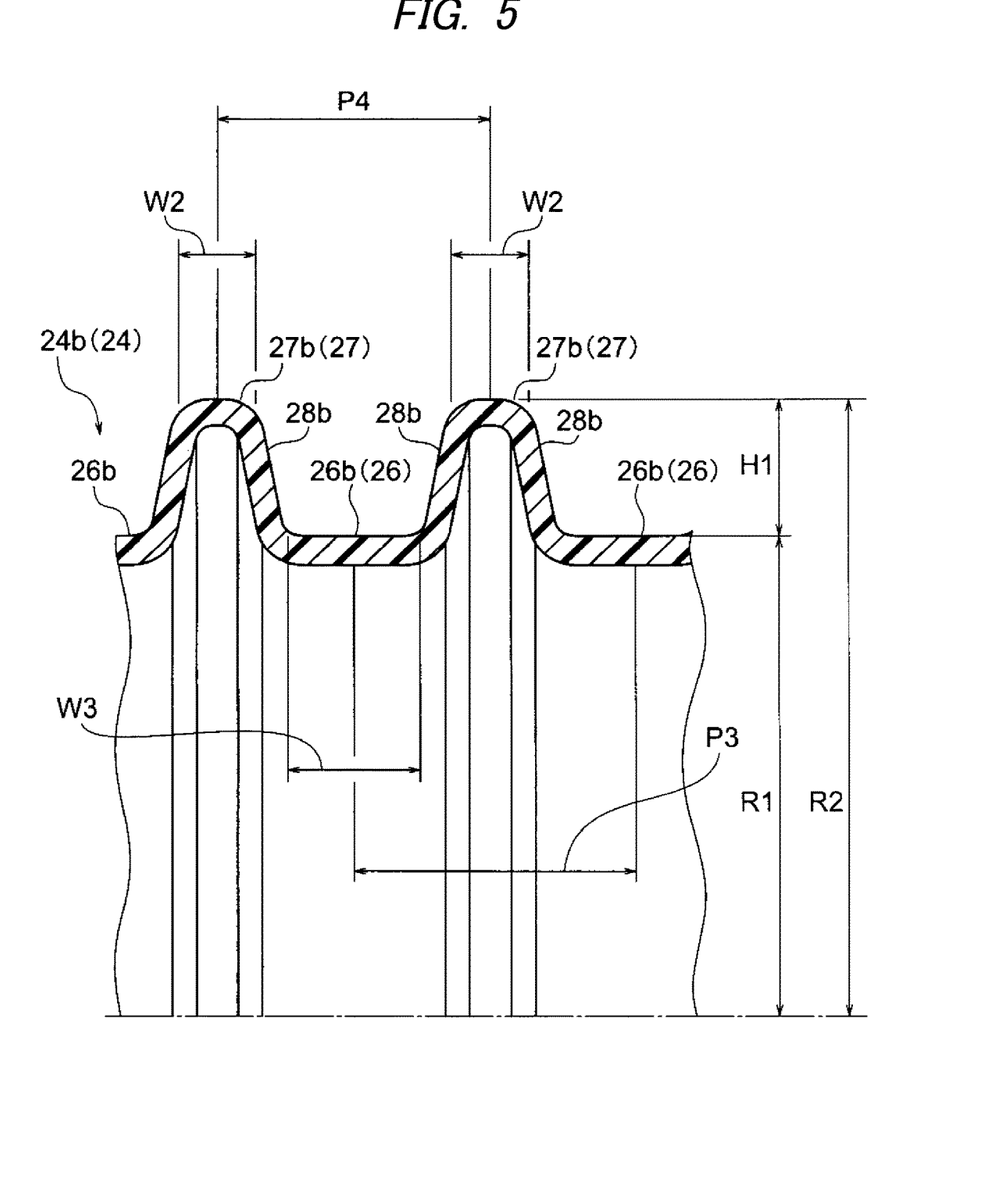
FIG. 5 is a vertical sectional view of a low-flexibility section of the flexible tube portion.
Figure 6:
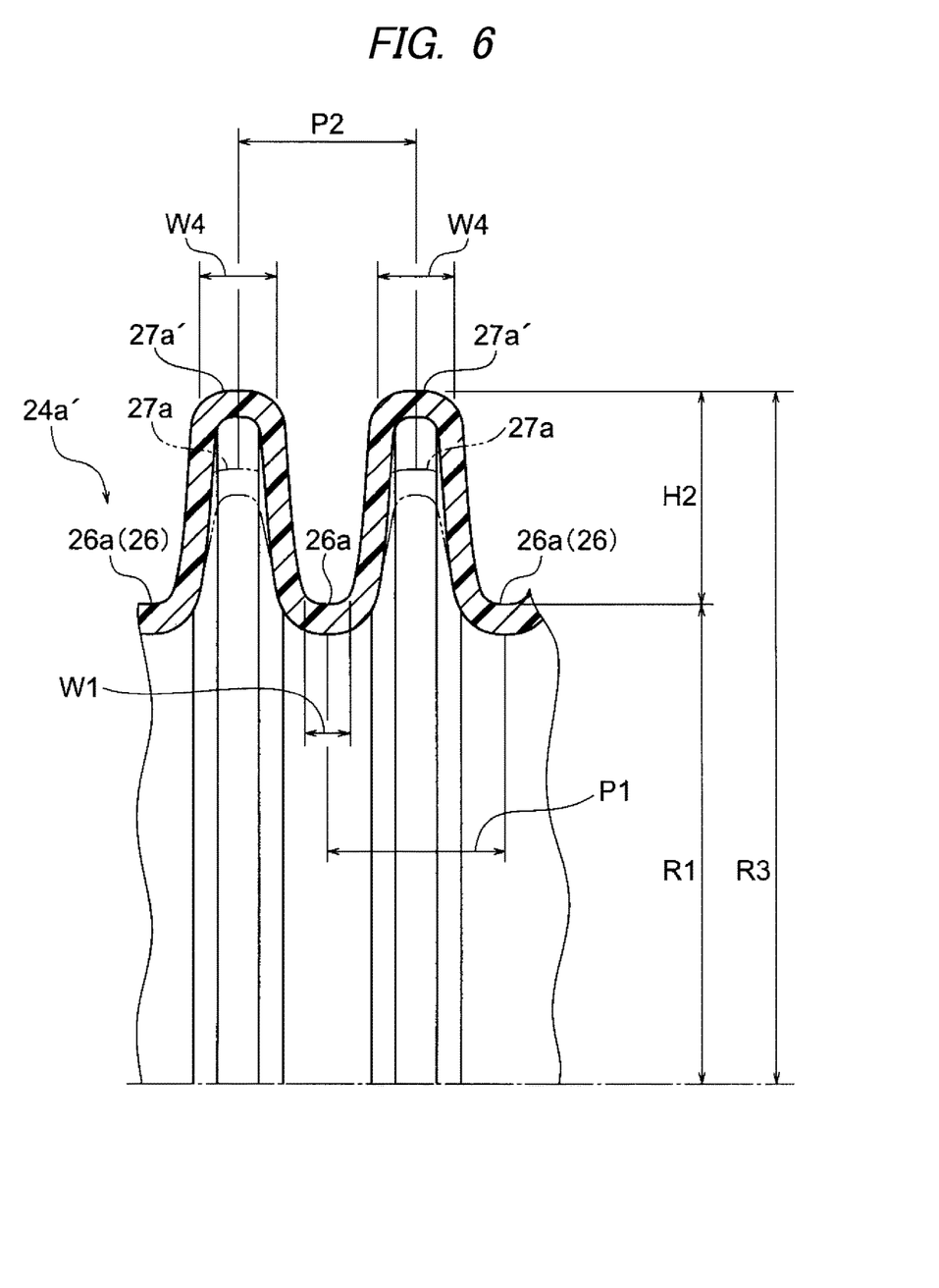
FIG. 6 is a vertical sectional view of a high-flexibility section according to a modified example.
Figure 7A:
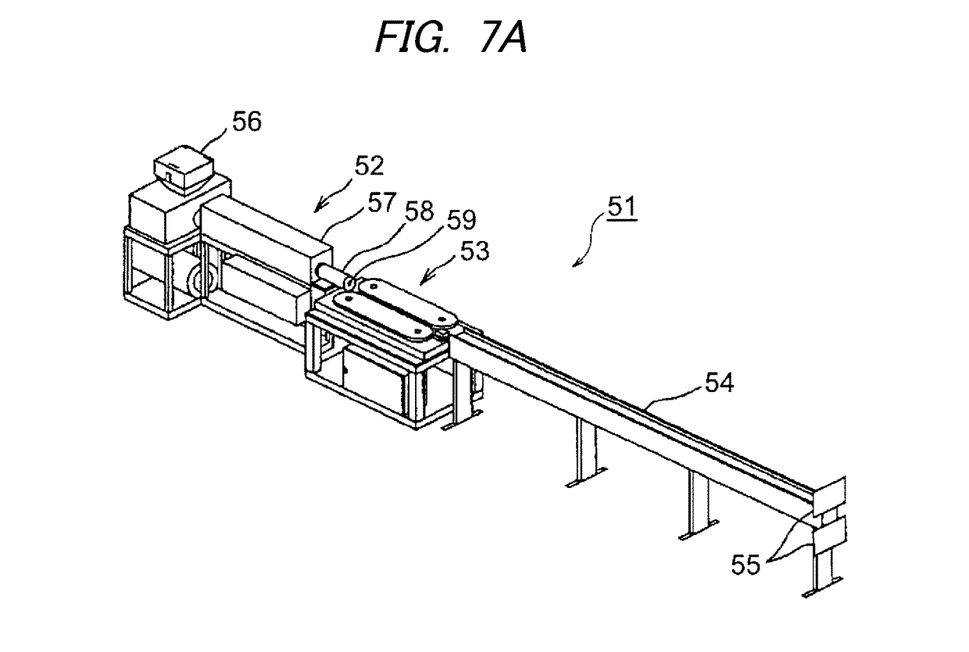
FIGS. 7A and 7B are views showing an outer cover fabricating apparatus.
Figure 7B:
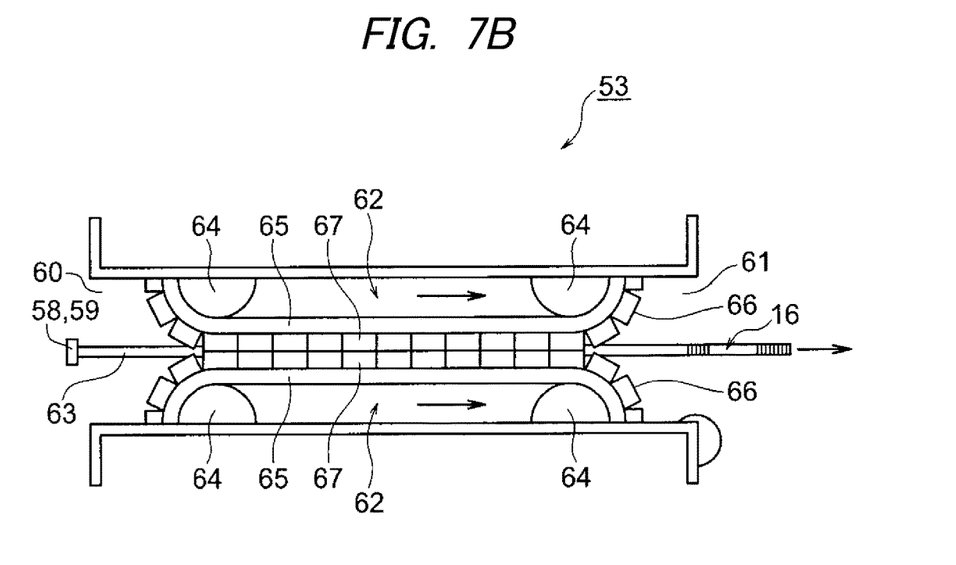

Hereinafter, referring to FIGS. 1 to 7B, a wire harness according to an embodiment of the invention will be described. FIG. 1 is a schematic view showing a routing of the wire harness of the embodiment. FIG. 2 is a cross-sectional view of the wire harness, FIG. 3 is a perspective view of an outer cover, FIGS. 4 to 6 are vertical sectional views of flexible tube portions, and FIGS. 7A and 7B are views showing a fabricating apparatus for an outer cover.

In this embodiment, the invention will be described as being applied to a wire harness which is laid out or arranged in a hybrid electric vehicle (the invention may also be applied to an electric vehicle or a general automotive vehicle.).

In FIG. 1, reference numeral 1 denotes a hybrid electric vehicle. The hybrid electric vehicle 1 is a vehicle which is driven by a combination of power of an engine 2 and power of a motor unit 3. Electric power from a battery 5 (in other words, a battery pack) is supplied to the motor unit 3 via an inverter unit 4. In this example, the engine 2, the motor unit 3 and the inverter unit 4 are installed in an engine compartment 6 which is situated near front wheels. The battery 5 is installed in a vehicle rear portion 7 which is situated near rear wheels. The battery 5 may be installed in a vehicle passenger compartment which is situated at the rear of the engine compartment 6.

The motor unit 3 and the inverter unit 4 are electrically connected by a high-voltage wire harness 8. The battery 5 and the inverter unit 4 are electrically connected by a high-voltage wire harness 9. The wire harness 9 is formed long, and an intermediate portion 10 thereof is arranged under a vehicle floor 11. The wire harness 9 (in other words, a high-voltage conduction path 15 and an outer cover 16) is arranged under the vehicle floor 11 so as to extend from a front to a rear of the vehicle floor 11 therealong and substantially parallel thereto. The vehicle floor 11 is a known body and is a so-called panel member. Through holes (not shown) are formed in predetermined positions on the vehicle floor 11. The wire harness 9 is passed through these through holes in a water-tight fashion. This allows the wire harness 9 to be arranged from the engine compartment 6 which is disposed at a front side of the vehicle floor 11 through the through hole to extend from the front to the rear of the vehicle floor 11 thereunder. Thereafter, the wire harness 9 is arranged again into an interior portion of the passenger compartment after passing through the through hole and is then arranged to the vehicle rear portion 7 which is disposed at the rear side of the vehicle floor 11.

The wire harness 9 and the battery 5 are electrically connected via a junction block 12 which is provided on the battery 5. A rear end 13 of the wire harness 9 is connected electrically to the junction block 12 by a known method. A front end 14 of the wire harness 9 is connected electrically to the inverter unit 4 by a known method.

The motor unit 3 has a motor (not shown) and a generator (not shown). The inverter unit 4 has an inverter (not shown) and a converter (not shown). The motor unit 3 is formed as a motor assembly including a shielding case (not shown). The inverter unit 4 is also formed as an inverter assembly including a shielding case (not shown). The battery 5 is a Ni-metal hydride battery module or a Lithium ion battery module. For example, a battery device such as a capacitor can also be used as the battery 5. There is imposed no specific limitation on the battery 5, provided that the battery 5 can be used in the hybrid electric vehicle 1 or an electric vehicle.

In FIG. 2, the wire harness 9 includes a high-voltage conduction path 15 (that is, electrically-conducting path) and an outer cover 16 accommodating the high-voltage conduction path 15 for protection, shielded connectors (that is, connecting member, not shown) which are provided at ends of the high-voltage conduction path 15, a plurality of clamps (that is, fixing members, not shown) attached to an outer surface of the outer cover 16, and a grommet (that is, a water-stopping member, not shown) which is attached similarly to the outer surface of the sheathing 16 in a water-tight fashion.

The wire harness 9 may be configured so that a low-voltage electrically-conducting path is accommodated in the outer cover 16 together with the high-voltage conduction path 15 for protection.

The high-voltage conduction path 15 includes two high-voltage circuits 17, a shielding member 18 covering the two high-voltage circuits 17 and a sheath 19 which is provided on an external side of the shielding member 18. This configuration of the high-voltage conduction path 15 is one of its configuration examples.

In this embodiment, the high-voltage circuit 17 is a known high-voltage electric wire and includes a conductor 20 and an insulator 21 covering the conductor 20. The high-voltage circuit 17 has a length necessary to realize a required electrical connection. The high-voltage circuit 17 is formed long because the wire harness 9 electrically connects the inverter unit 4 and the battery 5 (in other words, the junction block 12) (see FIG. 1).

The conductor 20 is made of copper or a copper alloy, or aluminum or an aluminum alloy. A conductor structure in which strands are twisted together into a conductor or a conductor structure in which a rod of a rectangular or circular cross section constitutes a conductor (a conductor structure in which for example, a flat angular core or round core constitutes a conductor, and in the case of this conductor structure being adopted, the wire itself is formed into a rod) may be adopted as the conductor structure of the conductor 20. The insulator 21 which is made from an insulating resin material is extruded over an outer surface of the conductor 20 which is configured as described above, whereby the conductor 20 is formed.

In this embodiment, although a known high-voltage electric wire is adopted as the high-voltage circuit 17, the invention is not limited thereto. Namely, a configuration may be adopted in which an insulator is provided on a known bus bar to form a high-voltage circuit.

The shielding member 18 is an electromagnetic shielding member covering the two high-voltage circuits 17 collectively (that is, a shielding member designed to deal with electromagnetic wave), and a known braid is adopted therefor which is made by interlacing a number of strands into a tubular shape. The shielding member 18 is formed so as to have the same length as an overall length of the two high-voltage circuits 17. The shielding member 18 is electrically connected to the shielding case (not shown) of the inverter unit 4 (see FIG. 1) via the shielded connector (not shown) at one end portion thereof.

As long as a countermeasure against electromagnetic wave can be incorporated, for example, a conductive metallic foil or a member containing this metallic foil may be adopted as the shielding member 18.

The sheath 19 is formed by extruding an insulating resin material over the outer surface of the shielding member 18 to a predetermined thickness and is disposed in a position which constitutes an outermost layer of the high-voltage conduction path 15. The sheath 19 is worked at ends thereof so as to allow the shielding member 18 to be exposed over a predetermined length in fabricating the wire harness 9. The sheath 19 is worked to be slightly longer than, for example, the outer cover 16 after the ends thereof are worked in the way described above.

In addition to the high-voltage conduction path 15, a known shielded wire is raised as the electrically-conducting path. At least one shielded wire or a plurality of shielded wires may be used. Alternatively, a high-voltage coaxial composite conduction path (not shown) is also raised so that a single cable has a positive circuit and a negative circuit coaxially or a single cable has three or more circuits coaxially.

In FIGS. 2 and 3, the outer cover 16 is a resin tube member covering the high-voltage conduction path 15 and is configured to have enough length for accommodating the high-voltage conduction path 15 extending therethrough and enough thickness to protect the high-voltage conduction path 15. The outer cover 16 is also formed with no seam or slit which communicates from an outer surface 22 to an inner surface 23 thereof (in other words, which establishes a communication between the outer surface 22 and the inner surface 23). The outer cover 16 is formed into a shape which can keep the high-voltage conduction path 15 away from exterior water (that is, can prevent the intrusion of exterior water thereinto). The outer cover 16 is also formed long.

In this embodiment, the outer cover 16 is formed to have a substantially rectangular cross section. This cross-sectional shape of the outer cover 16 is one of cross section examples that the outer cover 16 can take. The cross-sectional shape of the outer cover 16 may be circular, elliptic or oval. A flat cross-sectional shape is, of course, more effective in realizing a low height than a circular cross-sectional shape. The outer cover 16 has a plurality of flexible tube portions 24 having flexibility and a plurality of inflexible tube portions 25 having no such flexibility as the one that the flexible tube portions 24 have (in other words, having flexibility smaller than that of the flexible portions 24) and is formed into a shape shown in FIG. 3, for example.

The flexible tube portions 24 and the inflexible tube portions 25 are integrally resin molded so that the whole of the outer cover 16 becomes straight with the flexible tube portions 24 kept not deflected or straight. The flexible tube portions 24 and the inflexible tube portions 25 are formed so as to be disposed continuously in an alternating fashion in the axial direction (that is, longitudinal direction) of the tubular outer cover 16.

The flexible tube portions 24 are disposed in positions where the outer cover 16 has to match its shape with a shape of a portion of the vehicle where the outer cover 16 is attached (that is, a shape of a portion of the vehicle where the wire harness is arranged and a shape of a portion of the vehicle where the wire harness is fixed). The flexible tube portions 24 are also formed so long as to match the lengths of portions of the vehicle where the flexible tube portions 24 are attached.

By making different axial lengths of the flexible tube portions 24, the flexible tube portions 24 can be deflected over lengths required to match the shapes of portions of the vehicle where the flexible tube portions 24 are attached. The flexible tube portions 24 formed as described above can individually be deflected at desired angles when the wire harness 9 is packed or transported after fabrication or when the wire harness 9 is arranged on the vehicle (not shown).

The flexible tube portions 24 can not only be deflected to be bent but also be returned to their original straight shape as a matter of course.

The flexible tube portions 24 are formed into a corrugated tubular shape. Specifically speaking, the flexible tube portion 24 has concave portions 26 and convex portions 27 both extending in a circumferential direction, and these concave portions 26 and convex portions 27 are formed continuously in an alternating fashion in the axial direction. The flexible tube portion 24 is also formed into a corrugated tubular shape which has a high-flexibility section 24a and a low-flexibility section 24b by changing intervals between adjacent convex portions 27 (or adjacent concave portions 26). Namely, the flexible tube portion 24 has the corrugated tubular shape in which the intervals between the adjacent concave portions 26 or the intervals between the adjacent convex portions 27 are partially changed in the axial direction.

The high-flexibility section 24a is formed as a portion whose flexibility becomes higher than that of the low-flexibility section 24b by changing the intervals (specifically, widening the intervals) (that is, as a portion where the wire harness can be bent more easily). The high-flexibility section 24a is disposed at a position where bending stress is easily applied. Specifically, the high-flexibility section 24a is disposed in an adjoining portion between the flexible tube portion 24 and the inflexible tube portion 25. In this embodiment, the high-flexibility section 24a is disposed in a position of the flexible tube portion 24 which continues to the inflexible tube portion 25. The invention is not limited thereto, and hence, the high-flexibility section 24a may be disposed in, for example, a middle position of the flexible tube portion 24.

The low-flexibility section 24b is formed as a portion which constitutes other portions of the flexible tube portion 24 than the high-flexibility section 24a. In this embodiment, the low-flexibility section 24b is formed as a portion which has the same flexibility as that of a general corrugated tube. Additionally, in this embodiment, since the high-flexibility section 24a has higher flexibility, the low-flexibility section 24b is also formed as a portion where the wire harness is not bent more than required. The low-flexibility section 24b constitutes a portion which starts to deflect after the high-flexibility section 24a has started to deflect as following the high-flexibility section 24a.

Hereinafter, referring to FIGS. 4 and 5, detailed configurations of the high-flexibility section 24a and the low-flexibility section 24b will be described (configurations shown in FIGS. 4 and 5 are only one of examples that they can take).

In FIG. 4, here, concave portions 26 and convex portions 27 of the high-flexibility section 24a are denoted by reference numerals 26a and 27a, respectively. Concave portions 26a of the high-flexibility section 24a are formed as groove portions of a corrugated tubular shape. These concave portions 26a are formed so that a radius measured on an outer surface thereof becomes R1. Additionally, the concave portions 26a are formed so that a width of the groove portion as measured on the outer surface thereof becomes W1. Further, the concave portions 26a are formed so that intervals between the adjacent concave portions 26a become P1 based on a position which takes a median of the width W1.

Next, convex portions 27a of the high-flexibility section 24a are formed as ridge portions of the corrugated tubular shape. These convex portions 27a are formed so that a radius measured on an outer surface thereof becomes R2. Additionally, the convex portions 27a are formed so that a width of a top portion of the ridge portion as measured on the outer surface thereof becomes W2. Further, the convex portions 27a are formed so that intervals between the adjacent convex portions 27a become P2 based on a position which takes a median of the width W2.

A dimension H1 denotes a ridge height of the convex portion 27a and equals a difference between the radius R2 of the convex portion 27a and the radius R1 of the concave portion 26a. Reference numeral 28a denotes a sloped surface portion of the concave portion 26a and the convex portion 27a. In this embodiment, this sloped surface portion 28a is formed into a shape which slopes based on the dimensions described above.

In FIG. 5, similar to what has been described above, concave portions 26 and convex portions 27 of the low-flexibility section 24b are denoted by reference numerals 26b and 27b, respectively. Concave portions 26b of the low-flexibility section 24b are formed as groove portions of a corrugated tubular shape. These concave portions 26b are formed so that a radius measured on an outer surface thereof becomes R1. Additionally, the concave portions 26b are formed so that a width of the groove portion as measured on the outer surface thereof becomes W3. Further, the concave portions 26b are formed so that intervals between the adjacent concave portions 26b become P3 based on a position which takes a median of the width W3.

Next, convex portions 27b of the low-flexibility section 24b are formed as ridge portions of the corrugated tubular shape. These convex portions 27b are formed so that a radius measured on an outer surface thereof becomes R2. Additionally, the convex portions 27b are formed so that a width of a top portion of the ridge portion as measured on the outer surface thereof becomes W2. Further, the convex portions 27b are formed so that intervals between the adjacent convex portions 27b become P4 based on a position which takes a median of the width W2.

A dimension H1 denotes a ridge height of the convex portion 27b and equals a difference between the radius R2 of the convex portion 27b and the radius R1 of the concave portion 26b. Reference numeral 28 denotes a sloped surface portion of the concave portion 26b and the convex portion 27b. In this embodiment, this sloped surface portion 28b is formed into a shape which slopes based on the dimensions described above.

In FIGS. 4 and 5, the convex portions 27a and the convex portions 27b are formed to be identical in shape and height. However, the convex portions 27a and the convex portions 27b are set so that the intervals P2 between the adjacent convex portions 27a (that is, the convex portions 27a lying adjacent to each other) are narrower than the intervals P4 between the adjacent convex portions 27b (that is, the convex portions 27b lying adjacent to each other) (that is, the convex portions 27a and the convex portions 27b are set so that an inequality P2<P4 is satisfied). Additionally, when looking at the concave portions 26a and the concave portions 26b, the concave portions 26a and the concave portions 26b are set so that the width W1 becomes narrower than the width W3 (that is, the concave portions 26a and the concave portions 26b are set so that an inequality W1<W3 is satisfied). Consequently, the concave portions 26a and the convex portions 27a of the high-flexibility section are set at a narrow pitch than a pitch at which the concave portions 26b and the convex portions 27b of the low-flexibility section are set.

When the high-flexibility section 24a is formed to have the concave portions 26a and the convex portions 27a which are set at the narrow pitch, the high-flexibility section 24a makes up a portion which is bent (in other words, deflected) most easily in the flexible tube portion 24. When the high-flexibility section 24a starts to be bent, the adjacent convex portions 27a gradually approach each other, and the high-flexibility section 24a can be bent to such an extent that the adjacent convex portions 27a come into contact with each other at their top portions.

Here, a modified example of the high-flexibility section 24a will be described. The configuration of the high-flexibility section 24a is not limited to the configuration shown in FIG. 4. Hence, the following configuration will also be effective. Namely, a high-flexibility section 24a' having a large diameter as shown in FIG. 6 is also effective.

The high-flexibility section 24a' has concave portions 26a and convex portions 27a'. The concave portions 26a are formed into the same shape as that of the concave portions 26a of the high-flexibility section 24a shown in FIG. 4. Namely, the concave portions 26a are formed so that a radius becomes R1. The concave portions 26a are also formed so that a width of a groove portion becomes W1. Further, the concave portions 26a are formed so that intervals between the adjacent concave portions 26a become P1.

On the other hand, the convex portions 27a' of the high-flexibility section 24a' are formed so that a radius as measured on an outer surface becomes R3. The radius R3 is set larger than the radius R2 of the convex portions 27a of the high-flexibility section 24a shown in FIG. 4. Namely, the radius of the convex portion 27a' is set so that an inequality R3>R1 is satisfied. Additionally, the convex portions 27a' are formed so that a width of a top portion as measured on the outer surface thereof becomes W4. The width W4 is set smaller than the width W2 of the convex portions 27a of the high-flexibility section 24a. Namely, the width of the convex portion 27a' is set so that an inequality W4<W2 is satisfied. Further, the convex portions 27a' are formed so that intervals between the adjacent convex portions 27a' becomes P2 based on a position which takes a median of the width W4 (the interval P2 is the same as the interval P2 of the convex portions 27a of the high-flexibility section 24a). Furthermore, the convex portions 27a' are formed so that a ridge height becomes H2. The ridge height H2 is set larger than the ridge height H1 of the convex portion 27a of the high-flexibility section 24a. Namely, the ridge height of the convex portion 27a' is set so that an inequality H2>H1 is satisfied. Namely, the high-flexibility section 24a' is formed so that the ridge height of the convex portion 27a' is larger than that of the low-flexibility section 24b shown in FIG. 5.

The high-flexibility section 24a' is formed into a shape in which the diameter of the convex portion 27a of the high-flexibility section 24a shown in FIG. 4 is increased. Since the high-flexibility section 24a' is formed larger in diameter, the high-flexibility section 24a' becomes easier to be deflected.

Returning to FIGS. 2 and 3, as is obvious from what has been described heretofore, the outer cover 16 is formed into a configuration in which portions where the flexible tube portions 24 are disposed are formed into corrugated tubes. In other words, the outer cover 16 is formed into a configuration in which corrugated tubes are present partially. Since it has the corrugated tube portions as described above, the outer cover 16 can also be regarded as a "corrugated tube" or a "partial corrugated tube."

The outer cover 16 is configured such that there is no slit provided along the axial direction (that is, no axial separation is provided in a body thereof). The reason that no slit is provided is that the intrusion of water into the outer cover 16 is prevented so as to enhance the waterproofness thereof.

Additionally, the reason for no slit is that the high-voltage conduction path 15 is prevented from projecting from, for example, a portion of the sheathing 16 which is deflected. Further, the reason is that the rigidity of the sheathing 16 itself is enhanced. Additionally, the outer cover 16 can also be formed into a configuration in which no circumferential slit is provided. The reason that the outer cover 16 is so formed is the same as the reason that no slit is provided.

As long as points raised as the reasons that the outer cover 16 is formed into the configurations described above are satisfied, the outer cover 16 may be formed into a configuration in which the outer cover 16 is separated in a predetermined position. As this occurs, individual separated portions of the outer cover 16 are put together through bonding or fusing, or by a post-fitted member for connecting them together.

The inflexible tube portions 25 are formed as a portion which is not bent or remains straight when the wire harness 9 is packed or transported or when the wire harness 9 is arranged. The "portion which is not bent" means a portion to which the flexibility is not imparted in a positive fashion. Additionally, the inflexible tube portions 25 are formed into a straight tubular shape of a substantially rectangular cross section. This cross-sectional shape of the inflexible tube portion 25 is one of examples that the inflexible tube portion 25 can take, and hence, a circular cross section, an elliptic cross section or an oval cross section may be adopted. A flat cross section is, of course, more effective in realizing a low height than a circular cross section. The inflexible tube portions 25 are formed into configurations which match locations and lengths of portions of the vehicle where the inflexible tube portions 25 are attached. Since the inflexible tube portions 25 are formed into the straight tubular shape (a straight tube-like shape) as described above, the inflexible tube portions 25 can also be regarded as a "straight tube portion" or a "straight portion."

The inflexible tube portion 25 having a substantially rectangular cross section has, as shown in FIG. 2, a pair of long side wall portions 25a and a pair of short side wall portions 25b. When looking at the cross section shown in FIG. 2, the pair of long side wall portions 25a is configured to extend in a horizontal direction. On the other hand, the pair of short side wall portions 25b is configured to extend in a vertical direction in a slightly curved manner. With this cross-sectional shape, the inflexible tube portion 25 is strong with respect to a vertical external force and is also strong with respect to a vertical external force.

A plurality of ribs 29, 30 are formed on the inflexible tube portion 25 (see FIGS. 2 and 3). The ribs 29, 30 are formed as, for example, portions which enhance the rigidity of the inflexible tube portion 25 or portions which make it possible for attaching positions of retrofit members to be identified easily. The ribs 29, 30 can be formed into an arbitrary shape.

In the plurality of inflexible tube portions 25, the inflexible tube portion 25 which is attached to the underside of the vehicle floor 11 (see FIG. 1) is formed long. The inflexible tube portion 25 which is formed so long is attached so as to extend along a reinforcement, for example.

In FIGS. 7A and 7B, reference numeral 51 denotes a fabrication apparatus for resin molding, for example, an outer cover 16 (see FIG. 3). This fabrication apparatus 51 (that is, a resin molding apparatus) includes a resin extruding unit 52, a molding unit 53, a cooling unit 54, and a cutting unit 55.

The molding unit 53 continues to a downstream side of the resin extruding unit 52. The cooling unit 54 continues to a downstream side of the molding unit 53. The cutting unit 55 is provided at an end of the cooling unit 54 (that is, the cutting unit 55 is disposed at an end of the fabrication apparatus) and is activated to operate in cutting an outer cover 16 to a predetermined length.

The resin extruding unit 52 includes a hopper 56 which functions as a portion into which a resin material is introduced, an extruding unit main body 57 which continues to the hopper 56 and extends in a horizontal direction, and a die 58 which projects from an end portion of the extruding unit main body 57. The die 58 has a resin material extruding opening 59, and this resin material extruding opening 59 is disposed within an entrance 60 to the molding unit 53.

The molding unit 53 constitutes a portion configured to mold the resin material in a straight line from the entrance 60 to an exit 61 and has a pair of mold structure portions 62. The pair of mold structure portions 62 are disposed so as to lie on left- and right-hand sides of a soft, cylindrical resin material 63 (that is, a resin material) which is let out from the resin material extruding opening 59 of the die 58. The pair of mold structure portions 62 are configured to mold the resin material 63 into a predetermined shape.

The mold structure portions 62 each include a pair of timing pulleys 64 which are disposed along a traveling direction of the resin material 63, an endless belt 65 which is caused to travel in a direction indicated by an arrow in FIG. 7B by the pair of timing pulleys 64, and a mold block assembly 66 which is attached to the endless belt 65 to move together therewith.

The mold block assembly 66 has a plurality of mold blocks 67. The mold blocks 67 are aligned with no gap defined therebetween at a straight line portion of the endless belt 65. The mold blocks 67 are fixed to the endless belt 65 so as to be replaced by other mold blocks 67.

The mold blocks 67 are moved by the endless belt 65. By opening the mold blocks 67, individual portions of an outer cover 16 which are molded into predetermined shapes are pushed out of the molding unit 53 in a direction indicated by an arrow in FIG. 7B.

The fabrication apparatus 51 and the fabrication method described above are one of examples that the invention can take. The fabrication apparatus and fabrication method described above are of a suction type. In addition to those suction-type apparatus and method described above, for example, there are a blow-type fabrication apparatus and a blow-type fabrication method.

Here, the fabrication of the wire harness 9 will be described (not shown). Firstly, a working person inserts the high-voltage conduction path 15 into the outer cover 16 which is resin molded into the substantially straight line along the full length thereof from one end so as to extend therethrough to the other end. The working person attaches the shielded connectors to end portions of the high-voltage conduction path 15. The working person attaches clamps, grommets, boots and the like to predetermined positions on the outer surface of the outer cover 16. The wire harness 9 is fabricated through the series of fabricating operations.

After having been fabricated in the way described above, the wire harness 9 is packed by being folded at predetermined flexible tube portions 24. This enables the wire harness 9 to be packed compact. Since the high-flexibility sections 24a are provided in the flexible tube portions 24 of the outer cover 16, even though it is folded in the way described above, the wire harness 9 can be bent smoothly, and hence, there is caused no such situation that whitening on bending, for example, is generated in the outer cover 16.

Thus, as the embodiment of the invention has been described by reference to FIGS. 1 to 7B, in the outer cover 16 of the wire harness 9 according to the embodiment, the flexible tube portions 24 are formed into the corrugated tubular shape, while the inflexible tube portions 25 are formed into the rigid straight tubular shape. Therefore, although no protector is used, the outer cover 16 is effective in regulating the routing of the wire harness 9.

According to the outer cover 16 of the wire harness 9 according to the embodiment, since the flexible tube portions 24 are formed into the corrugated tubular shape in which the high-flexibility sections 24a and the low-flexibility sections 24b are provided, the flexible tube portions 24 can be bent smoothly at the high-flexibility sections 24a even at a position where bending stress is easily applied.

Because the wire harness 9 has the outer cover 16 as part of its structure, a favorable routing can be provided.

To implement the present invention, various changes may of course be made without departing from the scope of the invention.

Hereinafter, the wire harness according to the embodiment will be summarized.

(1) The wire harness 9 according to the embodiment includes at least one electrically-conducting path (the high-voltage conduction path 15) and the tubular outer cover 16 made of resin and covering the electrically-conducting path. The outer cover 16 includes the flexible tube portions 24 having flexibility and the inflexible tube portions 25 having smaller flexibility than the flexible tube portions 24. The flexible tube portion 24 has the corrugated tubular shape in which the concave portions 26 and the convex portions 27 both extending in the circumferential direction are alternately formed side by side in then axial direction of the flexible tube portion 24 and in which the intervals between the adjacent concave portions 26 or the intervals between the adjacent convex portions 27 are partially changed in the axial direction.

(2) In the wire harness 9, the flexible tube portion 24 has the low-flexibility section 24b and the high-flexibility section 24a, the intervals between the adjacent concave portions 26a or the intervals between the adjacent convex portions 27a being narrower in the high-flexibility section 24a than in the low-flexibility section 24b.

(3) In the wire harness 9, the flexible tube portion 24 has the high-flexibility section 24a at a portion adjoining the inflexible tube portion 25.

(4) In the modified example, the ridge height of the convex portion 27a' of the high-flexibility section 24a' at the adjoining portion is greater than in the low-flexibility section 24b.

(5) In the wire harness 9, the outer cover 16 is configured such that there is no slit extending along the axial direction.

(6) In the wire harness 9, the electrically-conducting path and the outer cover 16 are configured in an elongated manner to be arranged from a front to a rear of a vehicle floor 11 through an underside of the vehicle floor 11.

What is claimed is:

1. A wire harness comprising at least one electrically-conducting path and a tubular outer cover made of resin covering the electrically-conducting path,
   wherein the outer cover comprises a flexible tube portion having flexibility and an inflexible tube portion having smaller flexibility than the flexible tube portion,
   wherein the flexible tube portion has a corrugated tubular shape in which concave portions and convex portions both extending in a circumferential direction are alternately formed side by side in an axial direction of the flexible tube portion and in which intervals between the adjacent concave portions or intervals between the adjacent convex portions are different in the axial direction in one section of the flexible tube portion as compared to another section of the flexible tube portion, wherein the flexible tube portion comprises a low-flexibility section and a high-flexibility section, the intervals between the adjacent concave portions or the intervals between the adjacent convex portions being narrower in the high-flexibility section than in the low-flexibility section, wherein a ridge height of the convex portion is greater in the high-flexibility section than in the low-flexibility section, and wherein a width of a top portion of the convex portion of the high-flexibility section is smaller than a width of a top portion of the convex portion of the low-flexibility section.

2. The wire harness according to claim 1, wherein the flexible tube portion has the high-flexibility section at a portion adjoining the inflexible tube portion.

3. The wire harness according to claim 1, wherein the outer cover is configured such that there is no slit extending along the axial direction.

4. The wire harness according to claim 1, wherein
the electrically-conducting path and the outer cover are configured in an elongated manner to be arranged from a front to a rear of a vehicle floor through an underside of the vehicle floor.

5. The wire harness according to claim 1, wherein the outer cover includes a second flexible tube portion, the inflexible tube portion having smaller flexibility than the second flexible tube portion, and the inflexible tube portion extending from the flexible tube portion to the second flexible tube portion.

6. The wire harness according to claim 1, wherein the flexible tube portion and the inflexible tube portion are integrated as a single unit.

7. The wire harness according to claim 1, wherein the inflexible tube portion includes a plurality of ribs extending along an outer surface of the inflexible tube portion.

8. The wire harness according to claim 1, wherein the inflexible tube portion has a rectangular cross section, the inflexible tube portion comprising a pair of long side wall portions configured to extend in a horizontal direction and a pair of short side wall portions configured to extend in a vertical direction, the pair of short side wall portions extending in a curved manner in the rectangular cross section.

9. The wire harness according to claim 1, wherein the high-flexibility portion abuts each of the low-flexibility portion and the inflexible portion.

* * * * *